United States Patent Office 3,243,479
Patented Mar. 29, 1966

3,243,479
MIXTURE COMPRISING POLYAMIDE AND STYRENE-ACRYLONITRILE COPOLYMER
Russell L. Seelig, Jr., New Haven, Conn., assignor to United States Rubber Company, New York, N.Y., a corporation of New Jersey
No Drawing. Filed Dec. 27, 1962, Ser. No. 247,494
4 Claims. (Cl. 260—857)

The present invention relates in general to a novel composition of matter comprising styrene-acrylonitrile copolymer and nylon resins compounded together, and more particularly concerns a novel homogeneous styrene-acrylonitrile composition resulting from the mechanical mixture of the molten polymers of styrene-acrylonitrile copolymer and nylon.

The utility of styrene-acrylonitrile copolymer as a plastic has been sharply restricted by its low heat resistance. Even when subjected to moderate heating, say at about 212° F., for an extended time, say about 48 hours, this low dimensional stability copolymer undergoes a radical change in appearance due to excessive shrinkage and deformation.

It is a primary object of this invention to provide a novel composition of matter consisting primarily of styrene-acrylonitrile copolymer yet displaying an improved heat resistance and dimensional stability.

Broadly speaking, the present invention comprises a homogeneous styrene-acrylonitrile copolymer blend of molecularly dispersed styrene-acrylonitrile copolymer and nylon resins. More specifically, the present invention consists of a new homogeneous composition of matter having from 80 to 99 parts by weight of styrene-acrylonitrile copolymer resin and correspondingly from 20 to 1 parts (based on a total of 100 parts of the two components) of nylon resin molecularly dispersed therewith.

Styrene-acrylonitrile copolymer resins are plastics with a rather specific composition and molecular weight range. The composition by weight of the bound monomers therein is from 65 to 90% styrene and, correspondingly, from 35 to 10% acrylonitrile; the molecular weight corresponds to an intrinsic viscosity (0.25 gram per 100 grams of solvent at 30° C.) in dimethyl formamide of from 0.5 to 1.2. The dried copolymer resin used in the example, hereinafter for convenience called resin R, is made by standard emulsion polymerization techniques and has the following properties: (1) composition by weight is 71.5% styrene and 28.5% acrylonitrile; (2) melt-softening temperature range is 300–350° F.; (3) intrinsic viscosity in dimethyl formamide is 0.9.

The nylons used in this invention may include such well-known members of the polyamide family as polyhexamethylene adipamide (nylon 66) and polycaprolactam (nylon 6).

*Example I*

To demonstrate the utility of adding small amounts of nylon to the copolymer resin, test mixtures of styrene acrylonitrile copolymer resin R (made as described above by standard emulsion polymerization techniques) and nylon 66 resin ("Zytel 101," a hexamethylene diamine-adipic acid polymer having a melt-softening temperature range of 475–500° F.) were mixed in a plastics extruder at 550° F. The product was granulated, dried at 175° F. under a 25 inch Hg vacuum for 16 hours, and injection molded into test specimens. Test specimens were then boiled in water for 48 hours. Examination showed that the specimens containing 5 and 10% by weight nylon 66 deformed only slightly and showed almost no shrinkage (under 1%) in comparison with the 22% shrinkage exhibited by a similarly treated pure styrene-acrylonitrile comparison specimen. The addition of small amounts of nylon 66 to styrene-acrylonitrile resin greatly increases the heat resistance of the resin. The preferred compositions of this invention contain from about 1 to about 20% by weight nylon.

It should be understood that the precise proportions of the materials utilized may be varied if desired without departing from the scope and spirit of the invention as defined in the appended claims. For example, the nylon and styrene-acrylonitrile resins may be melt mixed or co-extruded, so long as there is a mechanical mixture of the molten polymers to produce a homogeneous material. It should also be understood that pigments, fillers, and the like may be incorporated into my compositions prior to shaping into useful molded articles.

Having thus described my invention, what I claim and desire to protect by Letters Patent is:

1. A homogeneous mixture having exceptional resistance to heat distortion comprising a styrene-acrylonitrile copolymer resin containing from 65 to 90% by weight of bound styrene and, correspondingly, from 35 to 10% by weight of bound acrylontirile and a polyamide resin selected from the group consisting of polycaprolactam and polyhexamethyleneadipamide resins, in relative proportions of from 80 to 99 parts by weight of said styrene-acrylonitrile copolymer resin and, correspondingly, from 20 to 1 parts by weight of said polyamide resin.

2. A homogeneous mixture having exceptional resistance to heat distortion comprising a styrene-acrylonitrile copolymer resin containing from 65 to 90% by weight of bound styrene and, correspondingly, from 35 to 10% by weight of bound acrylonitrile and a polyhexamethyleneadipamide resin, in relative proportions of from 80 to 99 parts by weight of said styrene-acrylonitrile copolymer resin and, correspondingly, from 20 to 1 parts by weight of said polyhexamethyleneadipamide resin.

3. A solid mixture comprising the cooled product of a molten mixture of claim 1.

4. A solid mixture comprising the cooled product of a molten mixture of claim 2.

References Cited by the Examiner

UNITED STATES PATENTS

| | | | |
|---|---|---|---|
| 2,550,650 | 4/1951 | Arnold | 260—857 |
| 3,033,813 | 5/1962 | Werner | 260—857 |

MURRAY TILLMAN, *Primary Examiner.*

P. LIEBERMAN, *Assistant Examiner.*